United States Patent Office

2,694,657
Patented Nov. 16, 1954

2,694,657

PICKLING FERROUS METALS

Nils Herman Brundin, Hoganas, Sweden, assignor to Ekstrand & Tholand, Inc., New York, N. Y., a corporation of New York No Drawing. Application September 28, 1951,
Serial No. 248,888

Claims priority, application Sweden October 4, 1950

23 Claims. (Cl. 134—13)

This invention involves the pickling of ferrous metals by a pickling solution containing ammonium bisulfate as the pickling agent, and includes in addition not only the recovery of the iron dissolved from the metal but also of the used pickling agent thereby permitting its re-use, and without any waste disposal problem, and with other advantages.

While some alloy steels are at times pickled with muriatic or nitric acids or mixtures of acids, dilute sulfuric acid of from about 5 to 20%, and frequently of from 6 to 10%, strength, still remains the most commonly and widely used pickling agent and on by far the larger portion of the iron and steel produced and fabricated. The oxides of the scale and rust are dissolved (and all too often some of the uncovered metallic iron) as ferrous sulfate, and possibly other sulfates, and accumulate in increasing concentration in the pickling bath solution. Thus, the entire acid content of the bath cannot be used, and usually only 75% of the original acid has been consumed when the effective activity of the pickling liquor has been exhausted or spent and the bath has to be renewed.

The disposal of the vast quantities of spent pickling liquors without, for example, extensive contamination of streams and rivers still is a very serious and difficult problem to the iron and steel industry. While many methods have been proposed for solving the problem, none has as yet appeared to be satisfactory enough to be adopted as common practice. The simplest solution seems to be neutralization of the pickling bath and precipitation of the iron with burnt lime, followed by filtering off or otherwise separating the resulting mixed precipitate from the solution. However, even this simple method has proven to be impractical because this mixed precipitate (iron hydroxide with calcium sulfate), not only is very poorly filtered but also has no value and thus presents a distinct disposal problem.

Then also considerable quantities of at least usually organic chemical pickling inhibitors that are costly are used in the endeavor to reduce the amount of clean metal so regularly dissolved away with the scale and rust by the pickling solution upon being freshly exposed to it.

The entire problem of disposal of spent pickling liquor is completely eliminated, the increased cost from loss by dissolved clean metal practically avoided without requiring a separate inhibitor, and in addition the pickling agent is substantially completely recovered, except for the customary losses by dragout when the cleaned iron and steel are removed from the pickling tank, and in the general handling of chemicals through chemical processes, by the pickling method of the invention. Moreover, the iron dissolved in the bath is recovered in a form which can be readily sold.

Broadly speaking, the method of the invention involves using an aqueous pickling bath for ferrous metals, which bath comprises in aqueous solution a ferrous metal pickling concentration of ammonium bisulfate as the pickling agent for the ferrous metal. At least usually, the bath can contain as dilute an aqueous solution of ammonium bisulfate as will dissolve the scale and rust at a conveniently practical rate for the operations in the particular plant. However, with too low a concentration and too high a volume of metal to be treated, the bath may be exhausted in too short a period for convenience and thus too frequently need to be replenished or replaced and treated for the recovery of the ammonium bisulfate as well as the dissolved iron. Then also, the solution can have as high a concentration of ammonium bisulfate as will still dissolve the scale and rust from the ferrous metals. For some plant production requirements, the rate of pickling at too high a concentration may not be suitable. A concentration of from about 100 grams to about 450 grams per liter at least usually can be found generally suitable. A further feature of the pickling bath used in the method of the invention is that its capacity to dissolve the freshly exposed metallic iron after its dissolution of the scale and rust is very much decreased from that of the usual sulfuric or muriatic acid pickling bath. Thus, the pickling bath used in the method of the invention inherently acts as its own pickling inhibitor and requires no addition agent for that purpose.

Considered broadly, the method of the invention involves subjecting the surfaces to be pickled of the ferrous metal to the pickling action of an aqueous solution containing in solution as its effective and essential pickling agent a pickling concentration of ammonium bisulfate, and generally suitably at a concentration from about 100 to 450 grams per liter. While this method can be operated at any temperature at which a suitable pickling rate is obtained, it is more effectively carried out at elevated temperature, effectively at about 35° C. and advantageously at a temperature from about 70° C. to any higher temperature preferably below the boiling point of the pickling solution. The metal to be cleaned is exposed to the action of this pickling solution long enough for the scale or rust to be removed from the metal.

Then, also the invention includes operating the method with this pickling solution until the pickling rate has fallen so low that it is no longer practical to continue pickling with it (which at least usually is at about the point at which the starting free sulfuric acid equivalence of the bath has fallen to about 25% of its original value), when the solution is treated to remove the dissolved iron and to recover ammonium bisulfate. This can be accomplished by several variations.

I. Viewed broadly, the dissolved iron is separated from the pickling solution in a form that is free from water-insoluble sulfates, or considered otherwise, in whatever form the iron is separated or recovered from the pickling solution, it is not associated with any chemical compounds that did not exist in the pickling liquor or solution when the recovery treatment started.

Only by way of illustration, in one instance, the iron is removed as a water-insoluble iron compound. One example is by adding ammonia to the spent pickling solution under oxidizing conditions, that preferably add no radicals other than sulfates to the solution, until all, or substantially all, of the dissolved iron is precipitated as ferric hydroxide, an easily filterable form. The iron can be converted to the ferric state in connection with this precipitation by blowing into the solution an oxidizing gas that adds no anion to the solution containing the dissolved iron. Any such gas can be used, such as ozone, oxygen, and preferably air because of its ready availability and low cost.

The precipitated ferric hydroxide is then separated by any convenient means, as filtration. Thereafter the filtrate containing at least usually only neutral ammonium sulfate is evaporated by available means to yield solid ammonium sulfate. The latter is then heated at a temperature to decompose it into liberated ammonia and solid ammonium bisulfate. This heating is at least at a temperature at which this decomposition occurs, and is at least at 175° C., at which this decomposition starts, and preferably higher, and advantageously to about 370° C. where the decomposition is complete. The products from it are used in the process, the ammonium bisulfate being dissolved in water or a weak pickling solution to pickle additional metal and the ammonia being added to additional spent pickling solution (or solution not yet spent removed from processing as described below) to precipitate the iron dissolved in it.

In another instance, and likewise only by way of illustration, the iron is removed as a water-soluble salt of it, for example, ferrous ammonium sulfate as exemplified in variation III below. Other possible specific methods of removing the iron either as a water-insoluble compound, or water-soluble salt, of iron, than those just described, are intended to be embraced by the broad procedure for its separation as set forth in the first paragraph under I above.

II. When the pickling rate has dropped so low, say, that the particular pickling bath in use could become the "bottle-neck" in the production sequence of the plant, and a test on a sample from the pickling solution shows that after the iron would be precipitated, the ammonium sulfate concentration in the filtrate is too low, let us say about 10%, more or less, to permit an economical evaporation (because of the so great amount of water to be evaporated before getting solid ammonium sulfate), the process could be varied thus: More ammonium bisulfate is dissolved in the thus far used pickling solution, to bring its equivalence of free sulfuric acid up to say 10 to 15 percent or so. Then further pickling is carried out with the thus fortified solution until the iron sulfate and ammonium sulfate content is so high, for example, about 200 to 250 grams per liter of each (although there might be a little more or less of each or of one or the other), that either the pickling speed is reduced considerably or ferrous ammonium sulfate begins to crystallize out at the pickling temperature.

Then this batch of spent pickling solution can be treated as described under section I above for the precipitation and separation of the dissolved iron and the recovery, from the filtrate, of ammonium sulfate and its decomposition into ammonia and ammonium bisulfate.

III. In the preceding variation (described under II above) when the pickling is stopped, the spent pickling solution still contains so much unused ammonium bisulfate that it is equivalent to a considerable amount of free sulfuric acid to be neutralized by the addition of ammonia before the iron can be precipitated out as ferric hydroxide. As a consequence, an unnecessarily large amount of ammonium sulfate, more than ordinarily required for subsequent pickling load, is recovered after evaporating the filtrate from the hydroxide, to be decomposed into ammonia and ammonium bisulfate. This situation can be avoided by first foregoing the initial addition of ammonia and the precipitation of ferric hydroxide, and instead cooling the used pickling solution and thereby causing a large amount of its content of ferrous sulfate and ammonium sulfate to crystallize out as ferrous ammonium sulfate.

The solubility of the ferrous ammonium sulfate (from its two component salts) in this used pickling solution can be further decreased by adding ammonium sulfate to the solution before cooling it and then cooling it. The added ammonium sulfate is in excess over the amount required to combine with the content of ferrous sulfate to form ferrous ammonium sulfate with it so as more highly, or completely, to saturate the solution with the ammonium sulfate and thereby more completely crystallize out the ferrous ammonium sulfate. Whether this used pickling solution is cooled directly, or after addition of ammonium sulfate, it should be cooled to as low a temperature as is practical in relation to the amount of ferrous ammonium sulfate to be removed, say between about 10° and about 20° C., and preferably to about 10° C.

The crystals of ferrous ammonium sulfate are then separated from their mother liquor, dissolved in as little water as possible, and ammonia added to this solution, under oxidizing conditions (as above described), to precipitate ferric hydroxide which is separated, as by filtration, and the filtrate evaporated to yield dry ammonium sulfate which is heated to decompose it into ammonia and ammonium bisulfate, both of which are then used further in the manner noted in the preceding sections.

In the pickling solution (the mother liquor from the crystallization of the ferrous ammonium sulfate), thus freed of a large amount of its ferrous sulfate and ammonium sulfate content, a fresh amount of ammonium bisulfate (such as recovered from a preceding run) is dissolved and the pickling, by repetition of this procedure, can thus be carried on substantially indefinitely without discarding the pickling bath as a whole.

IV. By a modification of the immediately preceding procedure, it is possible to continue to use the original pickling solution by continuously withdrawing from it a selected practical, minor portion of the solution, cooling it sufficiently to crystallize out the ferrous ammonium sulfate, removing the crystals and returning their mother liquor to the pickling bath. Regularly from time to time, water and ammonium bisulfate, separately or as a solution of both of them, are added to the pickling solution in amounts corresponding to, and to compensate for, the amounts of water and sulfates lost from the bath by drag out or spoilage, and for the ammonium sulfate contained in the ferrous ammonium sulfate crystallized out, and removed from the fraction, of the pickling solution withdrawn for that purpose.

The ferric hydroxide obtained from the pickling solution by these several modifications of the method of the invention can be used as a starting material to prepare such iron compounds as can be made from it, or it can be dried and roasted to give an iron oxide that can be used in several obvious ways, including conversion to powdered iron for use in powder metallurgy.

Thus with no waste products to be disposed of, the waste disposal problem is entirely eliminated. In addition, the substantial reduction in clean metal that would otherwise have been dissolved in the pickling operation, had it not been for the pickling inhibitor characteristic of the ammonium bisulfate, and the return for the useful ferric hydroxide by-product, contribute at least two appreciable economies in the pickling operations. There is also the further saving in the elimination of the cost of pickling acid that is needed in the prior processes. Finally, when pickling alloy steels, whichever of the alloying metals are obtained in the pickling solution, can be recovered from it by known methods in the light of the foregoing description.

The invention may be illustrated by, but not restricted to, the following examples:

Example 1

Into a pickling tank was introduced a solution containing 234 grams of ammonium bisulfate per liter of water (corresponding to 10 grams of free sulfuric acid per 100 cubic centimeters of water). Pickling of wire was then carried out at a temperature of about 70° C. until the content of equivalent free sulfuric acid dropped to 2.5 grams per 100 grams of water. The bath then contained (per 100 cc. of water):

2.5 grams equivalent free sulfuric acid
11.6 grams $FeSO_4$=4.27 grams of iron
13.4 grams $(NH_4)_2SO_4$ Air and gaseous $NH_3$ were then blown through the solution until all iron was precipitated as $Fe(OH)_3$. The precipitate was then removed from the solution by filtering on a drum filter and thoroughly washed with water.

The filtrate solution then contained about 26.8 grams of ammonium sulfate per 100 grams of water. The filtrate solution was evaporated in a three-effect vacuum-evaporator, and the solid ammonium sulfate was decomposed in a covered three-phase electric furnace while introducing superheated steam into the mass to retard secondary reactions. The temperature was held at about 380° C. The ammonium bisulfate obtained was used to make up a new batch of pickling solution and the recovered ammonia stored for a succeeding precipitation of ferric hydroxide.

The losses of ammonium sulfate, mainly due to insufficient washing of the ferric hydroxide precipitate, were about 2.5% of the amount of ammonium sulfate, that should have been obtained in solution after filtering off the hydroxide. The amount of water that had to be evaporated per kilogram of dissolved iron was 23.4 kilograms. The amount of ammonium sulphate, that had to be decomposed per kilogram of dissolved iron was 6.27 kilograms.

Example 2

The pickling bath was made up in the same manner as in Example 1, and the pickling carried out in the same way. Instead of precipitating iron from the used pickling solution, fresh bisulfate was introduced until the amount of equivalent free sulfuric acid was 12.5 grams per 100 grams of water (that is 23.4 grams of fresh ammonium bisulfate per 100 grams of water). Then the pickling was carried on until the amount of equivalent free sulfuric acid was 2.5 grams per 100 grams of water. The solution then contained per 100 grams of water:

2.5 grams equivalent H₂SO₄
27.1 grams FeSO₄=10.0 grams of iron
26.4 grams (NH₄)₂SO₄

Precipitation and filtering was carried out in the same manner as in Example 1. The solution, after filtering, contained 53.6 grams ammonium sulfate per 100 grams of water. The solution was evaporated and the solid ammonium sulfate decomposed as in Example 1.

10 kilograms of water had to be evaporated per kilogram of dissolved iron.

5.36 kilograms of ammonium sulfate had to be decomposed per kilogram of dissolved iron.

*Example 3*

The pickling was carried out in the same manner as in Example 2. After the second pickling operation ferric hydroxide was not precipitated, but the solution was cooled down to 15° C. while stirring. Ferrous ammonium sulfate was then crystallized out and was removed from the solution by centrifuging. In this manner 30 grams of (NH₄)₂Fe(SO₄)₂ was removed per 100 grams of the solution or 60% of the contained iron.

Fresh ammonium bisulfate was then added to the pickling bath, and the pickling carried on as before until the solution became so high in iron that a new precipitation of ferrous ammonium sulfate could be carried out (that is about 10 grams of Fe per 100 grams of water). The ferrous ammonium sulfate was divided in two parts and each was treated with ammonia in one of the following ways, respectively:

(a) The ferrous ammonium sulfate was dissolved in so much water that corresponded to 6 kilograms of water per kilogram of iron and then ferric hydroxide was precipitated and filtered in the same manner as in Examples 1 and 2;

(b) The ferrous ammonium sulfate was partly dewatered and treated with gaseous ammonia, by which treatment a mixture of ferrous hydroxide, ferric hydroxide and ammonium sulfate was obtained. This mixture was dispersed in so much water that a saturated solution of ammonium sulfate was obtained, and thereafter the solution was separated from the solids by filtering.

The ammonium sulfate solutions were evaporated according to Examples 1 and 2 and the obtained ammonium sulfate treated also according to these examples.

4.71 kilograms of ammonium sulfate had to be decomposed per kilogram of dissolved iron.

In (a) 6 kilograms and in (b) 5.5 kilograms of water had to be evaporated per kilogram of dissolved iron.

While the invention has been described in relation to certain specific embodiments of it, it is understood that many modifications and substitutions can be made in it within the scope of the accompanying claims which are intended also to include equivalents.

What is claimed is:

1. A process of pickling a ferrous metal, which comprises subjecting the surfaces to be pickled of the metal, at a pickling temperature, to the pickling action of an aqueous solution containing as the pickling agent a pickling concentration of ammonium bisulfate.

2. A pickling process as claimed in claim 1, wherein the ammonium bisulfate concentration is from about 100 to about four hundred and fifty grams per liter.

3. A pickling process as claimed in claim 1, wherein during the pickling operation the pickling bath is kept at a temperature of at least about 35° C. and under its boiling point.

4. A pickling process as claimed in claim 1, wherein the pickling bath is kept at a temperature from about 70° C. to any higher temperature under its boiling point, during the pickling operation.

5. A pickling process as claimed in claim 1, wherein, when the rate of pickling scale or rust has decreased to a point at which it is too low for it to be practical to continue pickling with the solution, the iron dissolved from the metal is removed from the pickling solution and in a form free of water-insoluble sulfates.

6. A pickling process as claimed in claim 5, wherein iron dissolved from the metal is recovered in the form of ferric hydroxide.

7. A pickling process as claimed in claim 6, wherein to the solution containing, in the form of a water-soluble iron salt, the iron dissolved from the metal, enough ammonia is added to it, and the iron is oxidized to the ferric state, to precipitate as ferric hydroxide from about the major part, to all, of the iron dissolved in it.

8. A pickling process as claimed in claim 6, wherein an oxidizing gas that adds no anion to the solution containing the iron dissolved from the metal, is blown into the solution to oxidize the iron to ferric state.

9. A pickling process as claimed in claim 8, wherein air is the oxidizing gas blown into the solution to oxidize the iron to ferric state.

10. A pickling process as claimed in claim 1, wherein pickling with the bath is continued until the sulfuric acid equivalence of its acidity has fallen to about twenty-five percent of its original value before pickling was started.

11. A pickling process as claimed in claim 1, wherein, when the rate of pickling scale or rust has decreased to a point at which it is too low for it to be practical to continue pickling with the solution, ammonia is added to the solution containing, as a water-soluble iron salt, the iron dissolved from the metal to precipitate the iron, and an oxidizing gas, that adds no anion to the solution, is blown into the solution to oxidize the iron to the ferric state, and the precipitated ferric hydroxide is removed and the filtrate remaining is evaporated to dryness leaving ammonium sulfate.

12. A pickling process as claimed in claim 11, wherein the dry ammonium sulfate is heated to a temperature of at least 175° C. to start its conversion into ammonium bisulfate with liberation of ammonia, and the temperature is increased to about 370° C. to complete the conversion.

13. A pickling process as claimed in claim 11, wherein the dry ammonium sulfate is heated at least to the temperature at which it is converted into ammonium bisulfate and liberated ammonia, and the ammonium bisulfate is dissolved and used again in pickling additional metal, and the ammonia is used to precipitate iron from more solution containing iron dissolved from the metal.

14. A pickling process as claimed in claim 1, wherein, when the rate of pickling scale or rust has decreased to a point at which it is too low for it to be practical to continue pickling with the solution, enough ammonia is added to it, and the iron is converted to the ferric state, to precipitate as ferric hydroxide from about the major part, to all, of the iron dissolved in it.

15. A pickling process as claimed in claim 1, wherein, when the rate of pickling scale or rust has fallen to point at which it is too low for it to be practical to continue pickling with the solution, more ammonium bisulfate is added to the solution to raise its content of equivalent free sulfuric acid to a concentration that has a high enough rate of pickling, and pickling is continued until the rate again drops too low for it to be practical to continue, then the pickling solution is treated for the recovery of the iron in a form free of water-insoluble sulfates and for the recovery of ammonium sulfate.

16. A pickling process as claimed in claim 1, wherein the pickling is continued until ferrous ammonium sulfate crystallizes out of the pickling solution at the pickling temperature, then the pickling solution is treated for the recovery of the iron in a form free of water-insoluble sulfates and for the recovery of ammonium sulfate.

17. A pickling process as claimed in claim 1, wherein, when the rate of pickling scale or rust has decreased to a point at which it is too low for it to be practical to continue pickling with the solution and the acidity of the solution is greater than the equivalent of about fifteen grams of sulfuric acid per liter, the solution is cooled until at least a major portion of the iron dissolved from the metal is crystallized out as ferrous ammonium sulfate which is separated from its mother liquor and dissolved in water and from this solution the iron recovered in a form free of water-insoluble sulfates and then ammonium sulfate recovered after removal of the iron, and the ammonium sulfate is dried and heated to drive off ammonia from it and leave behind ammonium bisulfate which is dissolved in the mother liquor from the ferrous ammonium sulfate crystals and the resulting fortified mother liquor used to pickle additional metal.

18. A pickling process as claimed in claim 17, wherein the pickling solution is cooled at least to as low as 10° C. to crystallize out the ferrous ammonium sulfate.

19. A pickling process as claimed in claim 17, wherein ammonium sulfate is dissolved in the spent pickling solution to crystallize out a larger crop of ferrous ammonium sulfate crystals when the spent pickling solution is cooled.

20. A pickling process as claimed in claim 19, wherein enough ammonium sulfate is dissolved in the spent pickling solution to cause the removal of about all of the iron dissolved in it, as ferrous ammonium sulfate crystals.

21. A pickling process as claimed in claim 1, which further comprises continuously withdrawing from the pickling bath a selected minor portion of the pickling solution, which portion is then cooled to crystallize out at least the major part of its iron content as ferrous ammonium sulfate, removing the crystals and returning their mother liquor to the pickling bath, and correspondingly adding to the bath an amount of ammonium bisulfate to compensate for that portion removed from the bath by the ferrous ammonium sulfate, said ammonium bisulfate being obtained by recovery from the ferrous ammonium sulfate crystals.

22. A pickling process as claimed in claim 1, wherein the pickling is continued until ferrous ammonium sulfate crystallizes out of the pickling solution at the pickling temperature, then the pickling solution is treated for the recovery of the iron in a form free of water-insoluble sulfates.

23. A pickling process as claimed in claim 1, which further comprises continuously withdrawing from the pickling bath a selected minor portion of the pickling solution, which portion is then cooled to crystallize out at least the major part of its iron content as ferrous ammonium sulfate, removing the crystals and returning their mother liquor to the pickling bath, and correspondingly adding to the bath an amount of ammonium bisulfate to compensate for that portion removed from the bath by the ferrous ammonium sulfate.

References Cited in the file of this patent

UNITED STATES PATENTS

| Number | Name | Date |
|---|---|---|
| 1,326,585 | Feenie | Dec. 30, 1919 |
| 2,316,220 | Brown et al. | Apr. 3, 1943 |
| 2,418,955 | Shawcross | Apr. 14, 1947 |
| 2,423,385 | Hixson | July 1, 1947 |

FOREIGN PATENTS

| Number | Country | Date |
|---|---|---|
| 163,534 | Great Britain | May 26, 1921 |

OTHER REFERENCES

Handbook of Chemistry and Physics, 28th ed., 1944, Chem. Rubber Pub. Co., pages 344–5. (Copy in Sci. Library.)

Condensed Chemical Dictionary, Reinhold Pub. Co., N. Y., 3rd ed. (1942), page 72. (Copy in Sci. Lib.)